United States Patent
Dean et al.

[11] 3,764,196
[45] Oct. 9, 1973

[54] REENTRANT ACOUSTO-OPTIC LIGHT MODULATORS AND DEFLECTORS

[75] Inventors: Robert Earl Dean, Highbridge; Martin Feldman; Jack Page Griffin, both of Short Hills; Arthur Woodward Warner, Jr., Whippany, all of N.J.

[73] Assignee: Bell Telephone Laboratories, Incorporated, Murray Hill, N.J.

[22] Filed: Sept. 5, 1972

[21] Appl. No.: 286,221

[52] U.S. Cl. .................................................. 350/161
[51] Int. Cl. .............................................. G02f 1/16
[58] Field of Search .......................... 350/160, 161; 331/94.5; 250/199

[56] References Cited
UNITED STATES PATENTS

| | | | |
|---|---|---|---|
| 3,531,183 | 9/1970 | Aagard | 350/160 |
| 3,602,577 | 8/1971 | Byram | 350/161 |
| 3,611,436 | 10/1971 | Rigrod | 331/94.5 |
| 3,365,579 | 1/1968 | Enshwiller | 250/199 |
| 3,671,103 | 6/1972 | Uchida et al. | 350/161 |

*Primary Examiner*—William L. Sikes
*Attorney*—W. L. Keefauver et al.

[57] ABSTRACT

There are disclosed acousto-optic light modulators and deflectors in which the light beam path is folded in a wedge-shaped acousto-optic medium nearly in the plane of the wedge and the acoustic wave is propagated in a direction orthogonal to the plane of the wedge through the volume of the medium, at least in the portion thereof in which light beam overlaps are concentrated. Substantial reductions in the required drive power and material are achieved. Various species of the device also are disclosed employing variations of the principles of the wedge shape or variations of the electrode shape.

7 Claims, 9 Drawing Figures

REENTRANT ACOUSTO-OPTIC LIGHT MODULATORS AND DEFLECTORS

BACKGROUND OF THE INVENTION

This invention relates to improved acousto-optic deflectors and modulators.

The deflection and modulation of light by acousto-optic techniques has a number of practical applications. These include the laser machining of materials, random access memories and numerous more specific applications in the field of communication. Clearly the widespread use of these techniques requires devices that are economical in terms of material cost, manufacture and drive power requirements.

In the conventional acousto-optic deflector or modulator, the acoustic wave propagates through the active medium in a direction nearly orthogonal to the direction of the light beam. Specifically, the light beam is deviated slightly from the orthogonal direction to satisfy Bragg scattering conditions, in view of the relative optical and acoustic wavelengths. Typically, the deflected light or scattered light leaves the crystal at a similar small angle on the other side of the orthogonal direction from the main beam. In a given application, the choice of the light path interaction length and the aperture of the modulator or deflector involve compromises between high deflection efficiency at the Bragg angle, for which large interaction length is required, and a large angular range of efficient deflection, for which a small interaction length would be preferable. In modulators the required aperture may be relatively small; but in a deflector in which a large number of individually resolved light beams are to be achieved, the aperture must be sufficiently large to ensure a maximum number of resolvable spots within the angular range, yet not so large as to affect the desired speed in forming the spot of light.

These practical limitations on light interaction length and aperture increase the difficulty of minimizing the volume of active medium employed and the drive power that is used to achieve the desired result. Nevertheless, improvement with respect to minimizing or reducing these latter quantities is desirable.

SUMMARY OF THE INVENTION

According to our invention, in an acousto-optic light modulator or deflector, the light beam path is folded in a wedge-shaped acousto-optic medium nearly in the plane of the wedge; and the acoustic wave is propagated in a direction orthogonal to the plane of the wedge through the volume of the medium, at least in the portion thereof in which light beam overlaps are concentrated. A substantial reduction in the required drive power is achieved as well as a reduction in the volume of the active medium needed.

It is a subsidiary feature of our invention that still further reduction in the required drive power can be achieved by concentrating the electrodes and transducers for the acoustic wave over the portion of the medium in which most light beam overlaps are concentrated. This further reduction, however, is achieved at the expense of some increase in the volume of the active medium.

BRIEF DESCRIPTION OF THE DRAWINGS

Further features and advantages of our invention will become apparent from the following detailed description, taken together with the drawing in which.

DESCRIPTION OF ILLUSTRATIVE EMBODIMENT

General Considerations

If the light path is folded in the acoustic field, the deflector or modulator size and the total acoustic power required for a given deflection efficiency will be reduced. Compared to conventional deflectors, the gains, defined by $$\text{Materials gain} = LH/\text{Area of deflector} \quad (1)$$

$$\text{Power gain} = LH/\text{Area of transducer} \quad (2)$$

will be greater the more times the light passes through the same acoustic field. In Equations (1) and (2), L is the optical interaction length and H iis the optical beam aperture, or the width effectively presented to the entering light beam by the deflector or modulator. In equation (1), the area of the deflector is the area of the active medium, typically a crystal, in a plane parallel to the plane of the transducer. It should be pointed out, however, that the power density, which may be a limiting factor on the transducer, is the same as for a conventional design. If the transducer area equals the deflector area, we shall simply refer to "the" gain of the deflector.

The typical special considerations of using reentrant designs are: (1) additional polished faces, (2) stricter flatness requirements proportional to the number of reflections, and (3) low loss mirrored surfaces that may be employed. Furthermore, it is desirable in a reentrant design that the deflection medium be sufficiently isotropic in its optical properties that the interaction with the light is not affected by the variety of directions in which the light propagates. Fortunately, many suitable deflecting media, including lead molybdate, have the required symmetry.

Although the power density is unchanged, the fact that the geometry is in some cases more favorable to the removal of heat may reduce the overall rise in temperature. Also, those configurations which use the same or nearly the same entrance and exit faces land themselves to liquid immersion cooling schemes.

Details of the Illustrative Embodiments

Figure 1:
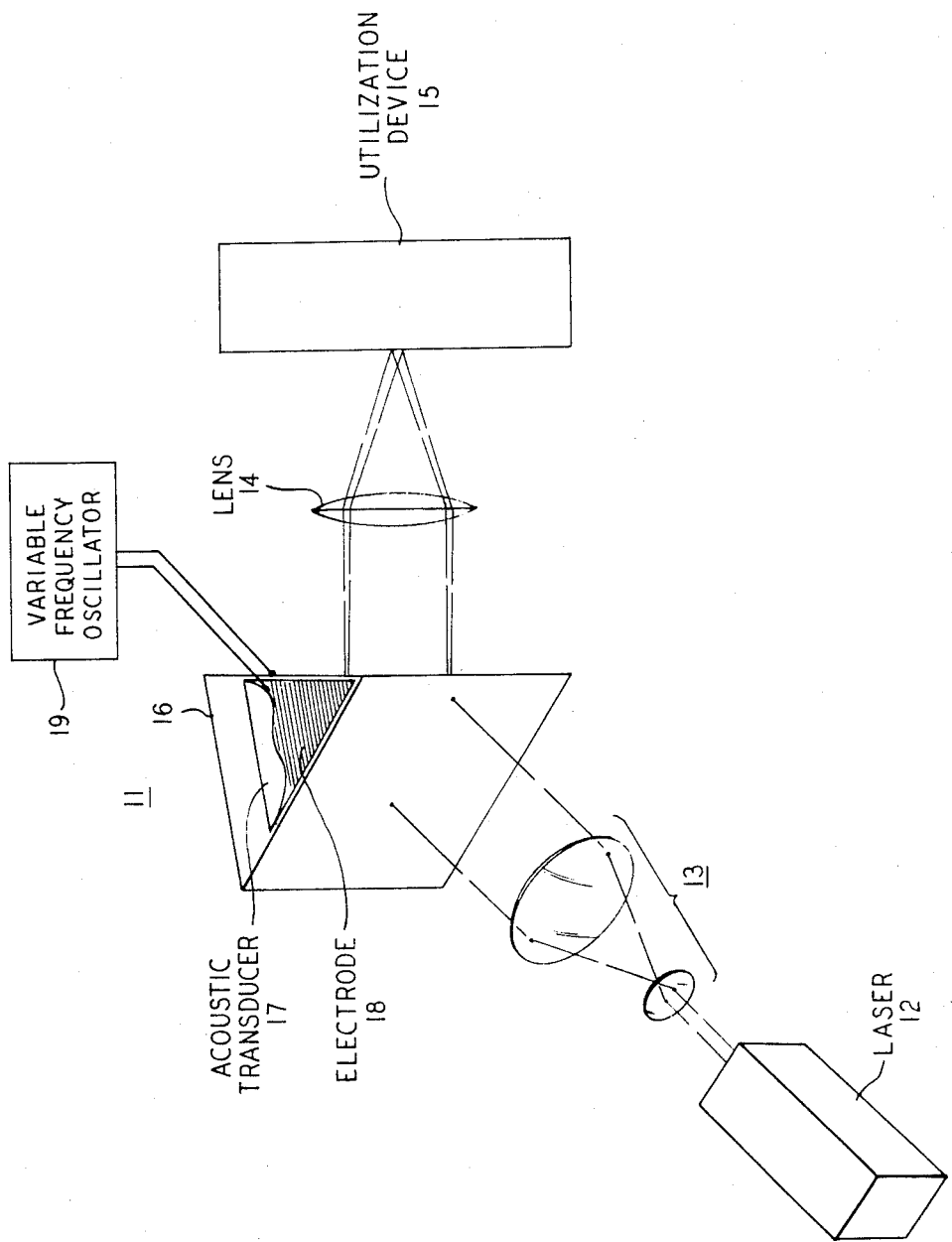
FIG. 1 is a partially pictorial and partially block diagrammatic illustration of a preferred embodiment of our invention.

The preferred embodiment of FIG. 1 employs a wedge-shape acousto-optic device 11 in which the active medium 16, illustratively lead molybdate with the c-axis perpendicular to the plane of the transducer, is a wedge-shaped body. That is, its shape is a triangular shape in the horizontal plane, illustratively isosceles triangular, and is rectangular in any vertical plane and specifically in the vertical planes which are the entrance and exit surfaces of the device for the light beam and also the base surface of the wedge shape, which is the third vertical surface of the body 16.

The device 11 is intended for the modulation or deflection of coherent optical radiation from the laser 12 which is directed into the body 16 by suitable lens system 13. The output components of the light beam exiting the body 16 may be collected by another lens system 14 and directed toward the utilization device 15. The device 11 is a deflection device if the utilization device 15 is adapted to utilize components of the output beam in more than one of the illustrative output positions. It is a modulation device if the utilization device 15 is adapted to use only the undeflected portion of the beam or a certain deflected component.

The device 11 includes the transducer 17 and an electrode 18 thereover as well as a base electrode to convert the electrical signal from the variable electrical oscillator 19 into an acoustic wave propagating vertically through a major portion of the body 16. Transducer 17 and electrode 18 are of conventional known type except that they are reduced in area as compared to the top surface of the active medium 16 so that they overlie the portion of active medium 16 in which light beam overlaps are concentrated. Moreover, electrode 18 is illustratively provided with a curvilinear shape along the direction which is generally parallel to the base of the wedge shape of medium 16 in order to provide equal modulation for each lateral portion of the light beam in medium 16. The desirability for this curvilinear shape is derived from an analysis of fringing fields and boundary effects for the acoustic wave as well as from the configuration of ray paths for the light beam within the medium 16.

In operation, for the case in which the wedge angle of device 11 is 30 degrees, and for the particular transducer and electrode shape shown, it is found that a power gain of about 5.5 is obtained and that a materials gain of about 1.4 is obtained. In other words, for the same acoustic power intensity and modulation efficiency, a prior art deflector or modulator would have required 1.4 times as much active medium as does device 11. The total power required by the prior art device would be 5.5 times as great. These figres are obtained for the optimum utilization of device 11 for which the input beam aperture, H, is selected to be half of the width of the entrance surface from the wedge apex half-way to the base; and the beam enters orthogonally to the entrance surface so that the total optical interaction length, L, in the folded path within medium 16 is 1.4 times the aperture, H. In other words, L = 1.4 H.

The entry angle of the light beam is 0° with respect to the surface normal in the horizontal plane in the case just described but of course deviates from the surface normal in the vertical plane by the Bragg angle of about 1°. At the output of the device, a similar beam will be deflected in the vertical sense, shifted in position by one of several increments from the undeflected beam, the number of possible separable increments depending on the divergence of the acoustic beam and the resolving power of the aperture.

Figure 2:
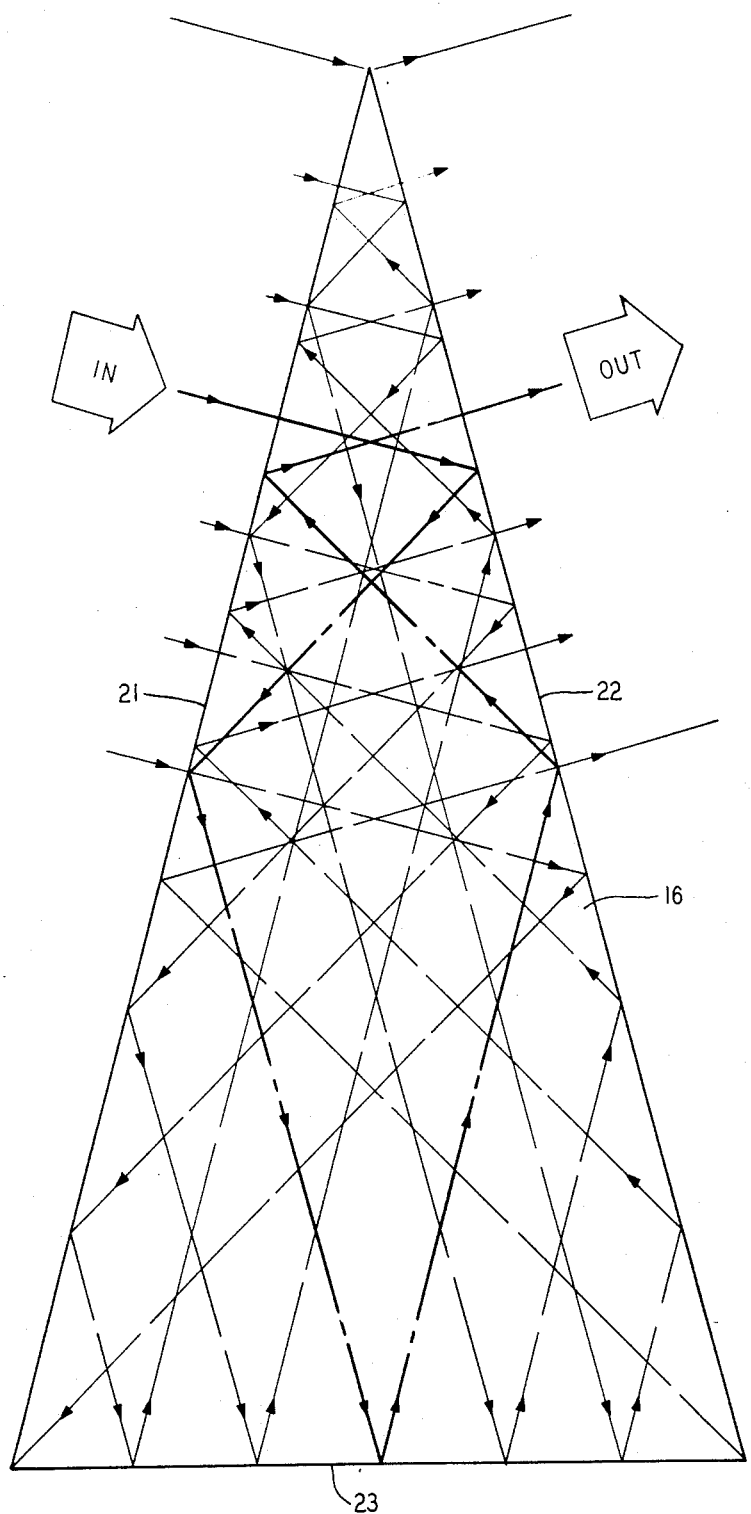
FIG. 2 is a picotorial illustration of the active medium of FIG. 1 upon which a plurality of internal ray paths within the beam are superimposed.

The folding of the light path within the active medium 16 is illustrated for a number of ray paths within the beam in FIG. 2. It may be seen in FIG. 2 that the light beam enters the lead molybdate medium 16 over half of the area of the entrance surface 21 and transverses the volume of the material extending from that portion of surface 21 to the other wedge surface 22 along the refracted path of the light beam. No angle of refraction is shown in FIG. 2 because the horizontal plane is illustrated and the "dip" angle of the light beam is orthogonal to that plane. The acoutsic wave is propagating vertically in the view of FIG. 2 that is, either in or out of the plane of the paper parallel to the edge of the wedge. After total internal reflection from the second wedge surface 22, the beam again transverses the same portion of the medium that it had just tranversed as well as the portion of the medium extending from the lower edge of the beam to the lower left-hand corner of body 16 in FIG. 2. It is then internally re-reflected from the entrance surface 21 toward the base surface 23. In this portion of its path, it retraverses the initial volume of material for a third time, the second volume of material for a second time and the remaining volume of material for the first time. The reflection of the light beam from the base 23 of wedge-shaped body 16 shows that the path and the regions traversed by the beam are symmetrically disposed about a plane orthogonal bisecting the base surface 23 and including the edge of the wedge. The light exits the body 16 orthogonal to the projection of the surface 22 on the plane of the drawing of FIG. 2, with a deflected beam having an angle in the vertical plane corresponding to the dip angle of the input beam plus an incremental deflection therefrom.

Figure 3:
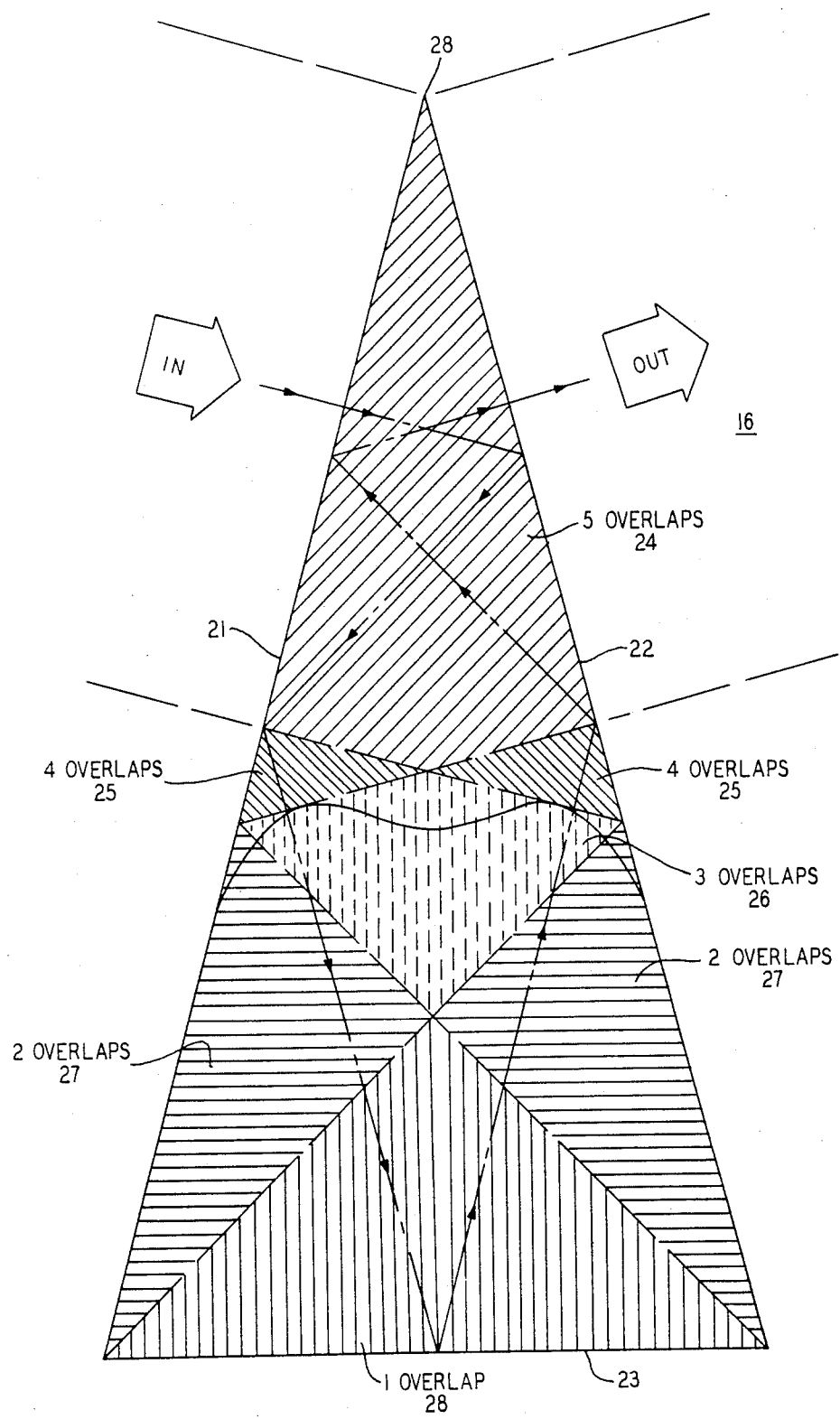
FIG. 3 is yet another illustration of the active medium of FIG. 1 in which the differing number of beam overlaps therein are indicated by differing shadings.

A more complete visualization of the way the beam overlaps in different portions of the crystal and active medium 16 is shown in the pictorial diagram of FIG. 3. Each portion of a planar cross section of the medium 16 in the plane of the wedge is cross-hatched with a different set of cross-hatching lines and the area is labeled with the number of beam overlaps occurring therein. It should be noted that the number of beam overlaps is one less in each case than the number of beam traversals of the region. In other words, five beam overlaps result from six beam traversals in the region closest to the edge of the wedge. It will be noted further that the number of beam overlaps decreases in a systematic way toward the base 23 of the wedge. The pattern of regions in general is symmetrical about a plane bisecting the base 23 and passing through the edge 28 of the wedge. Even in the triangular central region adjacent to the base 23, one beam overlap occurs because of tthe internal reflection of the optical radiation from the base 23.

From a consideration of the significance of FIG. 3, one can quickly come to a conclusion that the acoustic modulation provided by a wave propagating orthogonal to the plane of the diagram of FIG. 3 will certainly be most effective if it is concentrated near the edge of the wedge where the greatest number of beam overlaps exists. This consideration explains the placement of transducer 17 and electrode 18 of FIG. 1.

Figure 4:
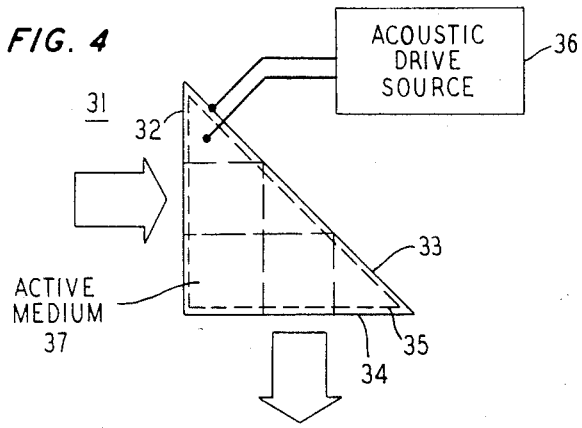
FIGS. 4 through 9 show specific modified wedge-shaped acousto-optic devices according to our invention.

The simplest possible form of our present invention is shown in FIG. 4 in which a single beam overlap is achieved in a right-angle wedge of the active medium 37. The complete modulation device 31 includes the wedge surface 32 through which the coherent optical beam enters, the orthogonal wedge surface 34 through which the modulated beam exits, the base surface 33 from which the optical beam is internally reflected, the transducer and electrode element 35 disposed on medium 37 parallel to the plane of the wedge, and the acoustic drive source 36 which applies the electrical potential varying in accordance with the signal between the medium 37 and the electrode portion of electrode transducer assembly 35.

The detailed fabrication and operation of device 31 of FIG. 4 corresponds generally to all the details set out for the embodiment of FIG. 1. In particular, it should be noted that the input light beam is in general broad enough to traverse all of the wedge surface 32, and likewise exits through all of surface 34 so that all of the active medium is used twice in the modulation process. The optical beam is shown with a narrower width for ease of illustration.

Figure 5:
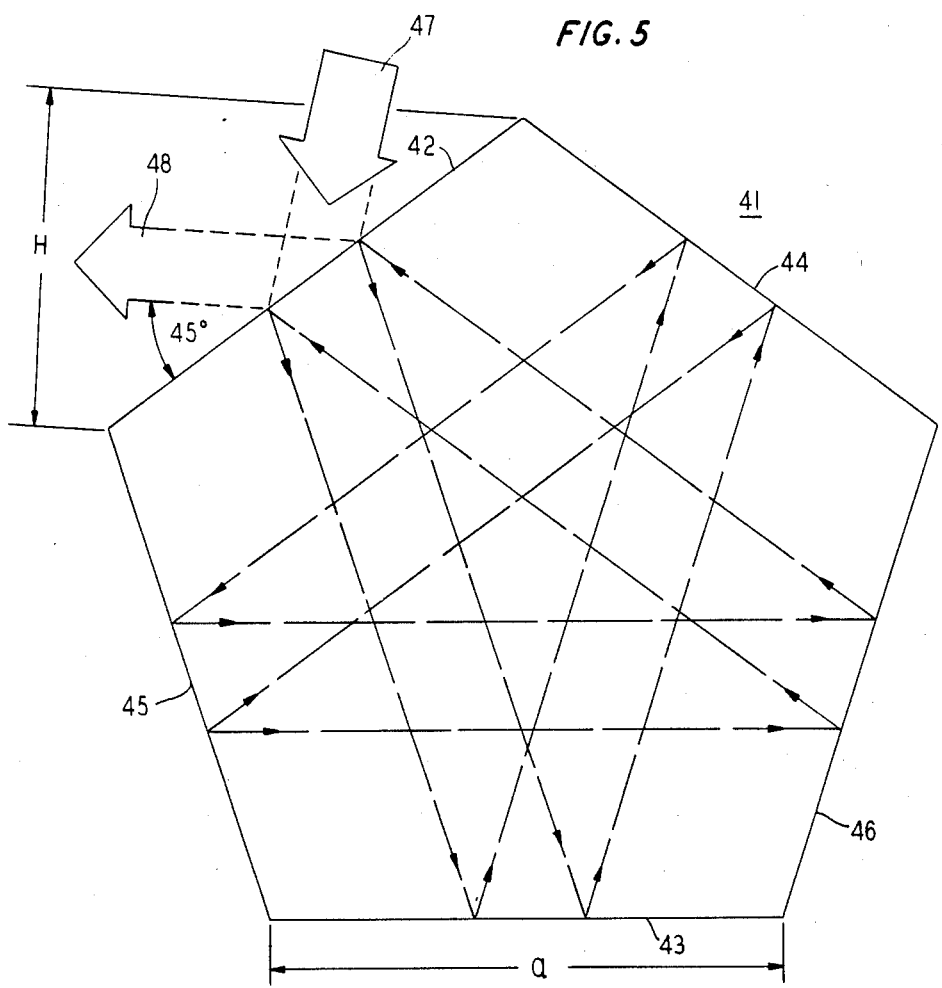

The same is true in the modified embodiment of FIG. 5 in which the beam 47 enters through the wedge surface 42 and the modulated components, as well as unmodulated components, of the beam eventually exit through surface 42 also, but are optically resolvable from the input beam by a difference in direction. As indicated by the dimension H, the effective aperture of the device 41 is the entire projection of the width of surface 42 orthogonal to either beam path. Note that the beam does not need to enter or leave the surface orthogonally, but can depend upon principles of refraction to achieve the proper direction inside the crystal parallel, for example, to the surface 45 of the opposing wedge component.

The active medium of device 41 has a shape which can best be described as a double wedge. If the device were split by a plane extending between the respective intersections of surfaces 42 and 45, and surfaces 44 and 46, two wedge shapes would result; and it would be seen that they are joined base-to-base. It will be noted that the two wedge angles differ and that the upper wedge-shaped component has the larger wedge angle by a substantial amount. The lower wedge shape is truncated short of the edge of its wedge to leave a truncated width $\alpha$ over which internal reflection of the beam must occur. If properly designed and used, the device 41 provides five beam traversals, or four overlaps throughout substantially all of the volume of the active medium. In practice, the greatest light intensity will occur at some distance removed from the surface with respect to which it is propagating in a parallel direction.

Figure 6:
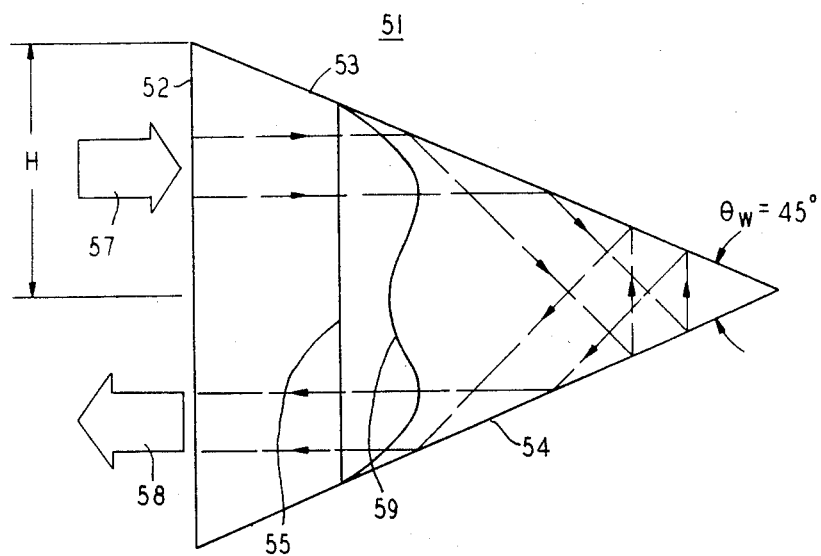
Figure 7:
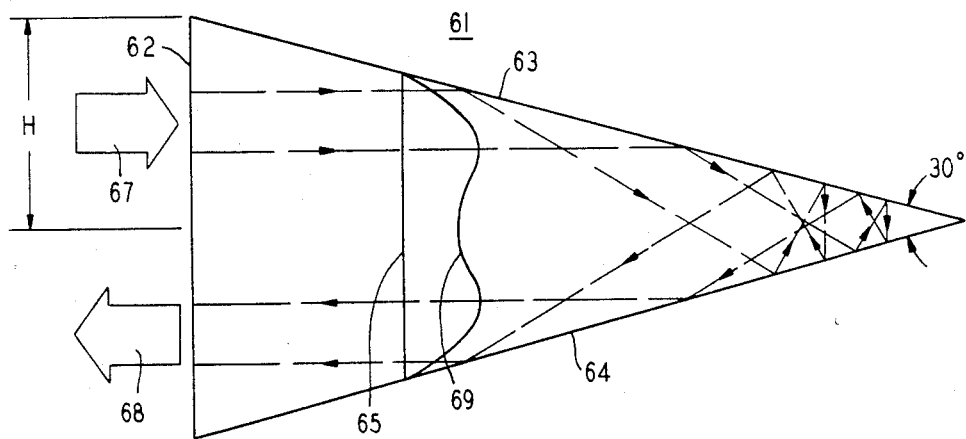

While the preceding embodiments have employed wedges in such a way that the beam entered and exited through a wedge surface, that is, a surface extending to the edge of the wedge which is characterized by the wedge angle, it is also possible to introduce and extract the beam through the base of the wedge as shown in the modified devices of FIGS. 6 and 7. An illustrative beam path is shown in FIG. 6 in device 51 using a material having a 45° wedge angle. Internal reflection occurs at both of the wedge surfaces 53 and 54 and the light propagates orthogonally to the base 52 which may be anti-reflection-coated. Transducer 55 and electrode 59 are selected to cover the region of the greatest number of beam overlaps as in the embodiment of FIG. 1. The curved-linear shape of the edge of electrode 59 which runs generally parallel to the base of the wedge is formed generally in the same manner as the electrode 18 of FIG. 1. The details of its shape can be calculated in a routine manner from a consideration of fringing field effects and boundary conditions.

In FIG. 7 a modified version of the device of FIG. 6 is shown for a wedge angle of 30°. All of the components are numbered 10 digits higher than in the device of FIG. 6.

Figure 8:
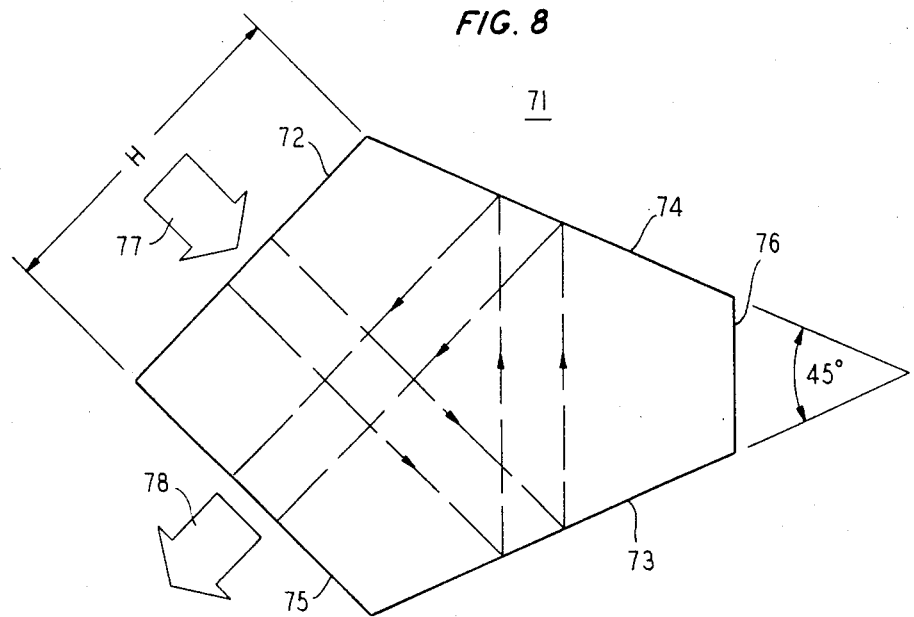
Figure 9:
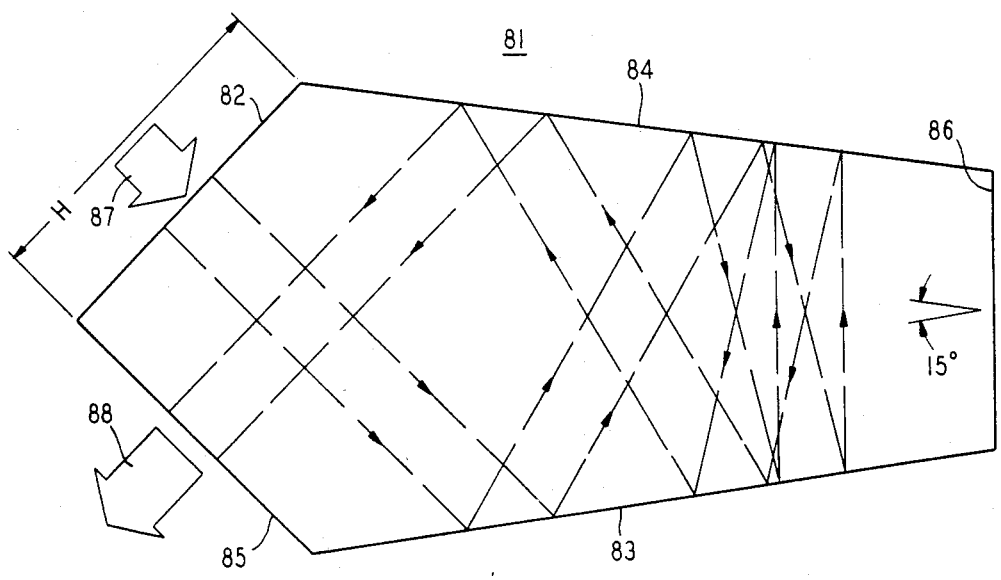

The double-wedge concept of FIG. 5 is extended in the devices 71 of FIG. 8 and 81 of FIG. 9 to devices in which the entry and exit wedge is a right-angle wedge so that the beams may enter and exit orthogonally to the wedge surfaces 72 and 75, 82 and 85, respectively. The opposing wedge shapes in each case have wedge angles substantially less than 90°, 45° in the case of FIG. 8 and 15° in the case of the device of FIG. 9. It may be readily seen by comparing the beam path in FIG. 9 to that in FIG. 8 that the smaller wedge angle tends to concentrate the beam overlaps in the thinner portion of the region having the smaller wedge angle.

Thus, in the device 71 of FIG. 8 the transducer and electrode would illustratively cover the entire surface parallel to the plane of the wedges, but in device 81 of FIG. 9, it could cover either the entire surface or merely the portion thereof closest to the truncated end surface 86 beyond which the 15° wedge angle would be formed if the surfaces 83 and 84 were extended.

In both cases the transducer and electrodes are not shown since a variety of possibilities should be apparent from the principles of the preceding embodiments.

The principles of operation of the embodiments of FIGS. 5 through 9 are similar to those described above for the embodiment of FIG. 1 and further depend upon the following considerations.

In applications where the H/L ratio is small, for example, modulators with long interaction lengths, high gains can be obtained with deflectors whose cross section is a regular polygon with an odd number, $n$, of sides. FIG. 5 illustrates the case of $n = 5$. Light enters one side at an angle such that it reflects from one of the nearly opposite sides, and after $n$ traversals, exits from the input face at a reasonably large angle to the entering beam.

The optical aperture is less than the width of each side by a factor equal to the sine of the input angle. In the limit of large $n$, the area $= (Hn)^2/4\pi$ and the interaction length, L, is $Hn^2/\pi$. Compared to the conventional design, this results in a gain of 4. For $n = 5$, L is $12.1H$ and the gain is $3.1$.

For relatively small $n$, it may be desirable to exit after $n-1$ traversals, extending the sides to provide normal (or other) entrances and exits. For large $n$, this results in the light leaving the deflector almost directly opposite the point at which it entered, with little (or no) change in direction.

Because of the large number of reflections care must be taken to insure that the mirrored surfaces are sufficiently flat; if the variations in optical path length for different parts of the aperture due to nonflat surfaces become comparable to a wavelength of light in the medium then the resolution will be degraded. In the special case of a modulator used at a beam waist, the aperture is usually so small, and the resolution requirement is usually so easily met, that the required flatness is readily attainable.

In the wedge geometry, the light makes multiple reflections between two plane surfaces which intersect at an angle $\theta$ which may assume one of the values $$\theta_n = \Phi/n, \quad n = 1, 2, \ldots , \tag{3}$$

where $\Phi$ is the total change in direction and where the integer $n$ corresponds to the number of reflections. As $\theta$ is made progressively smaller, the total number of traversals, and the length of the wedge, increases. The maximum number of traversals that is practical is limited only by the quality of the reflecting surfaces.

We have considered three ways of using isosceles wedges:

1. Light beam enters and exits normal to sides. (FIGS. 1, 4, 8 and 9)
2. Light beam enters and exits normal to base. (FIGS. 6 and 7)
3. Light beam enters and exits at 45° to the plane which bisects $\theta$.

Where reflection from the base occurs $\theta$ may assume values which satisfy $$180° - \theta_n/n = \theta_n; \quad \theta_n = 180°/n+1; \quad n = 1, 2, \ldots \tag{4}$$

Here odd values of $n$ correspond to the useful situation in which the entrance and exit surfaces are different. The case for $n = 1$ was considered in FIG. 4. FIG. 1 illustrates $n = 5$ ($\theta = 30°$). Higher values of $n$ are less useful since, for most useful deflector materials, they lead to geometries in which total internal reflection does not occur. Hence the sides of the wedge must be mirrored, restricting the available aperture since the entrance and exit apertures can no longer overlap internal beams. For $\theta = 45°$, H/L = 0.40 and the gain compared to a conventional design is 3.4. For $\theta = 30°$, H/L = 0.27, and the gain is 3.7.

The configurations shown in FIGS. 1 and 4 have a number of advantages, one of which is simplicity. They require only three polished surfaces; in FIG. 1, one surface is mirrored, and in FIG. 4 no surfaces are mirrored. FIG. 1 shows a proposed electrode configuration which will preserve a uniform interaction length for all parts of the light beam, producing an H/L ratio of 0.71 and a power gain of over 5.5. (The materials gain is only 1.4.) This would permit the construction of a lead molybdate deflector with an aperture, H, of 5 mm, 60 percent bandwidth centered at 140 MHz, and 70 percent deflection efficiency for visible light at less than 0.4 watts of drive power. Perhaps even more significant is the fact that such a deflector could operate at 1.06 micrometers with less power than is presently used to drive conventional deflectors in the visible, thus appreciably reducing the thermal and electrical problems at this wavelength.

FIG. 6 illustrates the case of $n = 4$, $\theta = 45°$, for which H/L = 0.20 and the gain is 2, and FIG. 7 illustrates $n = 6$, $\theta = 30°$, for which H/L = 0.13 and the gain is also 2. In spite of these relatively modest gains, the fact that the light is returned parallel to but displaced from the original beam may be useful in compact optical arrangements.

In cases in which the light enters and leaves at a 45° angle to the plane that bisects $\theta$ permissible values of $\theta$ can be found from the equation $$\theta_n = \phi/n, \quad n = 1, 2, \ldots \tag{5}$$

with $\phi = 90°$. Even values of $n$ correspond to the useful case of separated input and output light beams. For $n = 2$, $\theta = 45°$, we obtain the well known penta-prism shown in FIG. 5, but used in a different way. Here H/L = 0.30 and the gain is 3.2. For $n = 6$, $\theta = 15°$, H/L has decreased to 0.12 and the gain has increased to 3.7, or as high as that in FIG. 1.

An interesting variant is the use of only one 45° entrance-exit face, and $\theta = 90°/n$ with $n$ an odd number. Under these conditions the beam retraces its path. The advantage is that a larger aperture can be used for the same interaction length while maintaining a very high gain, although at the expense of separation problems.

To investigate the difficulties of producing a deflector with sufficiently vertical sides (approximately 1 minute tolerance) and to see if any unforeseen problems would arise, a 30° wedge, similar to that shown in FIG. 1 was constructed and its bandwidth, gain, and deflection efficiency made to provide an efficient mirror or acoustic termination.

The deflector material was lead molybdate, with the direction of sound propagation corresponding to the $c$-axis. For a 60 percent bandwidth centered at 140 MHz, the interaction path length, L, should be about 7 mm. This can be achieved with the design shown in FIG. 1 with the length along one side equal to 3.8 mm, corresponding to a 1.9 mm aperture. Such an aperture is a good match to the output beams of many lasers.

The actual deflector was somewhat larger, measuring 5.0 mm along one side. The effective transducer area was reduced, however, by a 0.2 mm border around the edge. This border reduced the calculated gain from 3.7 to 2.9, and the interaction length, L, to 8 mm.

Two tests were conducted, one a comparison of output versus Bragg angle setting, at center frequency, and the other a comparison measurement of absorbed electrical power at the transducer versus percent light in the deflected beam. The first test is a measure of bandwidth and can be related to the effective path length L by $\Delta\theta = \Lambda/L$ and $L_{max} \approx 2 n/\lambda_o V^2/f_o \Delta f$ where $\Lambda$ is the Bragg spacing, $\Delta\theta$ the variation in Bragg angle setting, and where $n$ is the index of refraction, $\lambda_o$ the wavelength of light in vacuo, V the velocity of sound, and $f$ the frequency.

The second test compared the deflection strength with a theoretical curve given by $I/I_o = \sin^2 \Delta\phi/2$ where $\Delta\phi = \pi \sqrt{2/\lambda_o^2 \, L/H \, M_2 P_{ac}}$ where $M_2$ is a figure of merit for one deflector material used and $P_{ac}$ is the effective acoustic power. The power required for the reentrant design is less by a factor of 2.5 than for a conventionally-designed deflector.

Values for the 30° wedge were calculated from the dimensions of the wedge, and also values based on the performance of the wedge in deflecting light at different incident angles and acoustic power levels. Thus, although the calculated path length, L, was 8 mm, the range of angles through which the deflector worked efficiently was a little smaller, corresponding to a path length L of 9 mm. The deviation between the calculated and the performance values was on the order of 10 percent, which was about the accuracy of measurement.

What is claimed is:

1. An acousto-optic device comprising:

a wedge-shaped acousto-optic medium oriented to receive a light beam for folded propagation therein nearly in the plane of the wedge, and means for launching an acoustic wave through a substantial portion of the volume of said medium in a direction orthogonal to the plane of the wedge.

2. An acousto-optic device according to claim 1 in which the wedge-shaped medium is oriented to receive the beam through a wedge surface other than the base of the wedge shape and to reflect the beam internally from the base of the wedge during the folded propagation therein.

3. An acousto-optic device according to claim 2 in which the wedge-shaped medium is shaped symmetrically about a bisector of the base of the wedge shape, whereby the beam exits from the second wedge surface symmetrically at the same angle from the surface normal as the angle of the beam from the surface normal of the first surface upon entry therein.

4. An acousto-optic device according to claim 1 in which the wedge-shaped medium is oriented to receive the beam through the base surface of the wedge shape and to reflect the beam internally from the wedge surfaces so that it ultimately exits through the base surface along a path that is optically resolvable from its entry path.

5. An acousto-optic device according to claim 1 in which the wedge-shaped medium has a shape corresponding to two wedge-shapes placed base-to-base, said shapes having differing wedge angles, said medium being oriented to receive the beam through a surface of the wedge shape having the larger wedge angle of the two wedge shapes.

6. An acousto-optic device according to claim 1 in which the means for launching the acoustic wave comprises a transducer restricted in area and shape to launch the wave only through a selected portion of the volume of the medium that is characterized by a greater number of beam overlaps therein than in the remaining portion of the medium.

7. An acousto-optic device according to claim 6 in which the means for launching the acoustic wave comprises an electrode having a smaller area than the transducer and a smooth shape to provide equal modulation pathlengths for all rays of the beam.

* * * * *